Feb. 27, 1962 R. W. SEXTON 3,022,859
GAS CLEANING METHOD AND APPARATUS
Filed May 20, 1959

*INVENTOR*
ROBERT W. SEXTON

BY Ralph B. Brick
ATTORNEY

United States Patent Office 3,022,859
Patented Feb. 27, 1962

3,022,859
GAS CLEANING METHOD AND APPARATUS
Robert W. Sexton, Louisville, Ky., assignor to American Air Filter Company, Inc., Louisville, Ky., a corporation of Delaware
Filed May 20, 1959, Ser. No. 814,518
10 Claims. (Cl. 183—15)

The present invention relates to a method and apparatus for gas cleaning and more particularly to a method and apparatus for removing undesirable vapor-mist constituents in a gaseous stream.

In industries such as the metal working and chemical ones where pickling, plating and other required processes produce noxious vapor-mist laden gaseous streams with concomitant problems in air pollution and plant maintenance, there has been an increasing demand for a system capable of removing the vapor-mist from such gaseous streams. In the past, most of the arrangements which have been used for this purpose have been expensive, complex and bulky in construction. In addition such past arrangements have required large quantities of water and have been capable of operating only at low velocities with high pressure drops.

The present invention avoids the above-mentioned disadvantages providing a method and apparatus which removes the noxious and undesirable vapor-mist constituents from gaseous streams in a straightforward, efficient manner in a minimum of space and with a minimum of operating materials. In addition, the present invention provides a method and apparatus for gas cleaning which can handle large volumes of gas at high velocity rates with a minimum of pressure drop.

Various other advantages of the present invention will be obvious to one skilled in the art upon reading the disclosure set forth herein.

More particularly the present invention provides a method for removing undesirable vapor and mist constituents from a gaseous stream laden therewith comprising the steps of passing the vapor-mist laden gaseous stream through a liquid entrainment zone to entrain in the gaseous stream a liquid coalescent with the vapor-mist therein, passing the vapor-mist laden gaseous stream with the liquid entrained therein to a contact zone to bring the vapor-mist and coalescing liquid of the gaseous stream into intimate contact to form liquid droplets in the gaseous stream, and then passing the liquid droplet bearing gaseous stream to a separating zone to separate such liquid droplets from the gaseous stream. The present invention further provides a novel apparatus for carrying out the inventive method including a housing providing a confined path for the flow of gas therethrough, entrainment means upstream in the housing for entraining in the gaseous stream a liquid coalescent with the vapor-mist in the gaseous stream, contact means in the housing downstream of the entrainment means to insure intimate contact of the coalescent liquid with the vapor-mist in the gaseous stream to thereby form liquid droplets in the gaseous stream, and separating means in the housing downstream of the contact means to separate the liquid droplets from the gaseous stream.

It is to be understood that various changes can be made by one skilled in the art in the several steps of the method disclosed herein and in the arrangement, form and construction of the apparatus disclosed herein without departing from the scope or spirit of the present invention.

Referring to the drawings which disclose one advantageous embodiment of the present invention:

Figure 1:
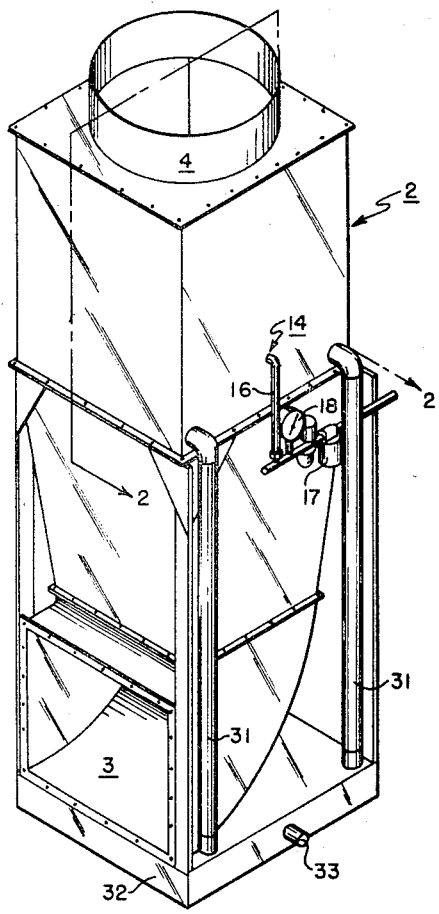
FIGURE 1 is an overall isometric view of the inventive apparatus.

Referring to FIGURE 1 of the drawings, there is disclosed a vertically positioned, substantially enclosed housing 2 having a gas stream inlet duct 3 at its lower portion which can be connected to another duct (not shown) that carries from an industrial installation the vapor-mist laden gaseous stream to be treated. Housing 2 is provided at its upper portion with a gas stream outlet 4 from which the gas stream is carried off after undesirable vapor-msit constituents have been removed. To remove such undesirable constituents from the gas stream, there is provided in housing 2, intermediate gas inlet duct 3 and gas outlet 4, an inventive arrangement which is straightforward in its construction, which requires a minimum of working parts and which can operate efficiently with a minimum of resistance to the gas stream. It is to be understood that to move the gas stream through the inventive arrangement in housing 2, a suitable blower means (not shown) can be provided either upstream or downstream of the arrangement, depending upon the circumstances for which the apparatus is employed.

Figure 2:
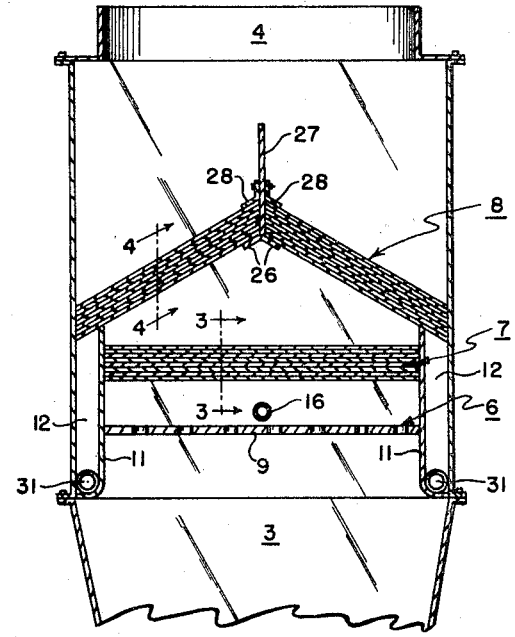
FIGURE 2 is an enlarged vertical cross sectional view of a portion of the apparatus of FIGURE 1 taken in a plane passing through line 2—2 of FIGURE 1.

Referring to FIGURE 2 of the drawings, it can be seen that the inventive arrangement broadly includes upstream of the direction of gas flow in housing 2, a liquid entrainment section 6. Spaced downstream from the liquid entrainment section 6 in housing 2 is contact section 7 and spaced downstream of the contact section 7 in housing 2 is a separating section 8.

In the embodiment disclosed, the liquid entrainment section 6 includes an apertured liquid distribution plate 9 similar to that disclosed in copending application Serial No. 308,454, now U.S. Patent No. 2,889,004, assigned to the assignee by Arthur Nutting and Robert W. Sexton. Distribution plate 9 is arranged in housing 2 to extend in a horizontal plane across the gas flow path. Two sides of plate 9 abut against and are fastened by some suitable means such as welding to sides 11 of drain channels 12 (to be described hereinafter) and the other two sides of plate 9 abut against and are fastened to the sides of housing 2. The plate 9 is sized to circulate liquid at or near what might be the rated gas volume and, in installations where the unit does not operate near its rated gas volume, the plate 9 can be partially blocked off. Although it is to be understood that the present invention is not to be restricted to the specific liquid entrainment arrangement disclosed, including the specific arrangement of apertures in distribution plate 9 and the liquid system therefor, in one advantageous embodiment of the apertured distribution plate 9, an arrangement of ¾" to 1½" diameter apertures on staggered centers to present a 25% to 40% open area has been found to be quite satisfactory. To provide a coalescent type liquid to the upper surface of distribution plate 9 in the embodiment of the invention disclosed, a liquid conduit system 14 is employed to introduce liquid from a suitable source (not shown) to the plate. Liquid system 14 includes a liquid distribution pipe 16 having one end extending within housing 2 above plate 9, pipe 16 being provided with a plurality of openings along such end to distribute the liquid uniformly along the distribution plate. As in aforementioned Patent No. 2,889,004, it is only necessary that small quantities of liquid be supplied to the surface of plate 9 so that the liquid can migrate to the edges of the apertures and form into shoulder-like masses for subsequent entrainment by the gas stream which passes from inlet duct 3 through the apertures of plate 9. Accordingly, to control the quantity of liquid delivered to plate 9, the conduit system 14 includes a liquid throttle valve member 17 and a pressure gauge 18. Since anyone of a number of well known liquid flow control arrangements can be utilized in the conduit system 14 to regulate the flow of liquid through conduit 16 to plate 9, only a broad general disclosure is made herein of the valve 17 and gauge 18. For most purposes, city water has proven to be a satisfactory coalescing liquid to feed into the system, it being fed at a controlled rate so as to provide approximately 3 quarts an hour drainage per square foot of separating section (separating section 8 being described hereinafter). In this connection, it is to be understood that other drainage rates and other type liquids can also be used, the rates and liquid types depending upon the chemical and physical nature of the gaseous stream to be treated.

Figure 3:
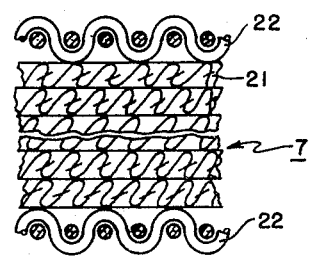
FIGURE 3 is an enlarged cross sectional view of the contact means included in the apparatus of FIGURES 1 and 2 taken in plane passing through line 3—3 of FIGURE 2.
Figure 4:
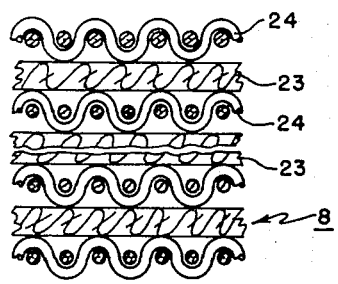
FIGURE 4 is an enlarged cross sectional view of the separating means included in the apparatus of FIGURES 1 and 2 taken in a plane passing through line 4—4 of FIGURE 2.

Positioned in housing 2 in spaced parallel relation to liquid entrainment section 6 and downstream thereof is liquid contact section 7. One of the primary purposes of contact section 7 is to insure that the liquid entrained by the gas stream at section 6 is brought into intimate contact with the vapor and mist present in such gas stream so as to form large liquid droplets, these droplets being subsequently separated with facility in the separating section 8. To effect the intimate contact, section 7 is arranged to include a maze of tortuous passages through which the gas stream must flow. In the advantageous embodiment disclosed, the tortuous passages are formed by sandwiching a number of parallel, contiguous layers of mesh-like cloth material 21 between comparatively rigid expanded sheets 22 (FIGURE 3). The sheets 22 extend in horizontal planes parallel to plate 9 and, like plate 9, have their sides fastened to sides 11 of the drainage channel 12 and the sides of housing 2. In the arrangement described, it is to be noted that contact section 7 does not include a drain for any liquid brought thereto by the gaseous stream being treated and, as will be seen hereinafter, such arrangement permits section 7 to be maintained in a desired saturated condition during gas treating operations. Further, it is to be noted that in instances where the gases to be treated bear vapor-mist of an acid nature, the mesh-like cloth layers 21 and expanded sheets 22 of section 7 can be fabricated from a suitable acid resistant material, or at least coated with such a material. In this connection, plastic mesh-like cloths fabricated from materials such as polypropolene, vinon, saran, or polyethylene have proven to be satisfactory under most acid mist bearing conditions.

Positioned upstream of contact section 7 and spaced therefrom is separating section 8. Section 8 includes a series of mesh-like cloth layers 23 which can be similar to cloth layers 21. These layers 23 are interleaved by spacer members 24 which can be of expanded sheet type similar to expanded sheets 22 of section 7. As will be seen more clearly hereinafter, spacers 24 provide passages between layers 23 to permit for the ready run-off of liquid droplets separated from the gaseous stream as it passes through section 8. When vapor-mist constituents of an acid nature are to be removed from the gaseous stream, layers 23 and spacers 24 can be formed from the same acid resistant materials as described above for layers 21 and sheets 22. In this connection, it is to be noted that since acid resistant materials are mostly of the "non-wettable" type, liquid droplets separated out in section 8 would form in globules in the section and be re-entrained in the gaseous stream if it were not for the run-off provisions afforded by spacers 24, and the arrangement described hereinafter.

The interleaved layers 23 and spacers 24 of section 8 are arranged in two separate halves extending in pyramid-like fashion transverse housing 2 with one edge of each half resting on a ledge 26 of a hanger member 27 that extends transverse housing 2. The opposite edge of each half of interleaved layers rests on the top edge of a side wall 11 which forms one of a pair of like drain channels 12 along opposite sides of housing 2. Since the top edges of side walls 11 are positioned in housing 2 below ledges 26, the halves of section 8 slope downwardly away from each other to provide such pyramid-like arrangement. A pair of facing hold down angle members 28, each with one leg bolted to hanger member 27, maintains the halves of section 8 in proper position. Although the slope of the halves of section 8 can be set in accordance with the results desired, an arrangement wherein the halves slope from the horizontal within the range of approximately 30° to 45° has been found to be quite desirable. Since spacers 24 form passages between the downwardly sloping mesh-like layers 23 of the halves of section 8, liquid droplets filtered out by the mesh-like layers 23 flow by gravity into drain channels 12. Each of drain channels 12 is provided with a drain conduit 31 which leads to a common drain tank 32. Drain tank 32, in turn, is provided with a drain outlet 33 to permit the liquid to be drained to a suitable drainage source (not shown) or, if desired, recirculated to the liquid system 14 by a suitable pumping system (not shown).

In a typical operation of the apparatus described herein, a coalescent liquid is introduced to the apertured distribution plate 9 of the liquid entrainment section 6 of housing 2, the amount of liquid introduced being controlled to permit formation of shoulder-like masses about the edges of the apertures of plate 9. At the same time, a gas stream to be treated is introduced into housing 2 through gas inlet duct 3, this gas stream being laden with watery vapor in a state of suspension (mist) and liquid in a gaseous form (vapor) to be removed therefrom. The gas stream is controlled by the blower (not shown) to pass through entrainment section 6 at a velocity not lower than the minimum required to entrain liquid therefrom. As the gas stream is passed through liquid entrainment section 6 in housing 2, a small portion of the mist impinges against plate 9 and falls back into the gas stream to be subsequently carried by the stream through the apertures in plate 9. When the gas stream passes through the apertures, it entrains some of the liquid from the shoulder-like masses formed around the apertures and carries it along therewith to contact section 7.

Since contact section 7 is of a non-drain arrangement, it quickly becomes flooded with the liquid brought to it by the gas stream and remains so during the entire gas treating operation. The liquid in contact section 7 includes that entrained by the gas stream from section 6, the mist carried by the gas stream prior to its coming into contact with section 6, and the liquid derived from the vapor initially carried by the gas stream and which has been condensed upon passing through entrainment section 6 or upon reaching contact section 7. Due to the maze of tortuous passages formed by the layers of mesh-like fabric 21 in contact section 7, the mist and condensed liquid of the vapor are intimately mixed and coalesced with the entrained liquid to form liquid droplets and, as the gas stream passes on from contact section 7, it carries these liquid droplets with it. When the gas stream reaches separating section 8, the liquid droplets are filtered out by the mesh-like layers 23. Because of the passages formed between layers 23 by spacers 24 and because of the sloping arrangement of layers 23 and spacers 24 in forming the pyramid halves of section 8 that drain to channel 12, the liquid droplets quickly pass by gravity flow into such channels 12. As the liquid drains to channels 12, the gas stream passes from housing 2 through gas outlet 4, free of the vapor-mist constituents with which it was originally laden.

From the above description, it is to be noted that a very minimum of resistance is presented to the treated gas streams. In the entrainment section 6, the apertures permit ready passage of the gas stream to be treated since the liquid is provided along the shoulders of the apertures and not over the apertures. In the contact section 7, only a thin maze of tortuous passages formed by the layers of mesh-like material is required to bring the entrained liquid into intimate contact with the liquid of the mist and from the condensed vapors to form the coalescent liquid droplets. Finally, in the separating section 8, only a few layers of mesh-like material is required since the separated liquid droplets are quickly passed from the mesh-like material to avoid any possible re-entrainment of such droplets and to permit further and continuous separation of liquid from the gas stream by such mesh-like material.

The invention claimed is:

1. A method for removing undesirable vapor and mist constituents from a gaseous stream laden therewith comprising the steps of passing said vapor-mist laden gaseous stream through a liquid entrainment zone to entrain in said gaseous stream a liquid coalescent with the vapor-mist therein, passing said vapor-mist laden gaseous stream with said liquid entrained therein downstream to a liquid flooded contact zone solely within the confines of said gaseous stream and preventing any drainage to a point outside said gaseous stream from said liquid flooded contact zone to bring said vapor-mist and coalescing liquid of said gaseous stream into intimate contact to form liquid droplets in said gaseous stream, and then passing said liquid droplet bearing gaseous stream to a seperating zone to separate such liquid droplets from said gaseous stream.

2. A method for removing undesirable vapor and mist constituents from a gaseous stream laden therewith comprising the steps of passing said vapor-mist laden gaseous stream through a liquid entrainment zone to entrain in said gaseous stream a liquid coalescent with the vapor-mist therein, passing said vapor-mist laden gaseous stream with said liquid entrained therein downstream to a tortuous passaged liquid flooded contact zone solely within the confines of said gaseous stream and preventing any drainage to a point outside said gaseous stream from said liquid flooded contact zone to bring said vapor-mist and coalescing liquid of said gaseous stream into intimate contact to form liquid droplets in said gaseous stream, and then passing said liquid droplet bearing gaseous stream to a separating zone to separate such liquid droplets from said gaseous stream.

3. A device for removing vapor-mist from a gaseous stream comprising a housing providing a confined path for the flow of gas therethrough, entrainment means in said housing for entraining in said gaseous stream a liquid coalescent with the vapor-mist in said gaseous stream, liquid flooded contact means in said housing downstream of said entrainment means, means to prevent any upstream drainage to a point outside said confined path for said gaseous stream from said liquid flooded contact means to insure intimate contact of the coalescent liquid with the vapor-mist in said gaseous stream to thereby form liquid droplets in said gaseous stream, and filter separating means in said housing downstream of said contact means to separate the liquid droplets from said gaseous stream.

4. A device for removing vapor-mist from a gaseous stream comprising a housing providing a confined path for the flow of gas therethrough, entrainment means in said housing for entraining in said gaseous stream a liquid coalescent with the vapor-mist in said gaseous stream, said entrainment means including aperture forming means presenting an aperture through which said gaseous stream is normally constrained to sweep at a velocity not lower than the minimum required to pick up and thereby entrain coalescent liquid from said aperture-forming means along the edge of said aperture, and means for supplying coalescent liquid to said aperture-forming means in amounts controlled to provide a shoulder of liquid extending along and adjacent to the edge of said aperture, liquid flooded contact means in said housing downstream of said entrainment means, means to prevent any upstream drainage to a point outside said confined path for said gaseous stream from said liquid flooded contact means to insure intimate contact of the entrained coalescent liquid with the vapor-mist in said gaseous stream to thereby form liquid droplets in said gaseous stream, and separating means in said housing downstream of said contact means to separate the liquid droplets from said gaseous stream.

5. A device for removing vapor-mist from a gaseous stream comprising a housing providing a confined path for the flow of gas therethrough, entrainment means in said housing for entraining in said gaseous stream a liquid coalescent with the vapor-mist in said gaseous stream, liquid flooded contact means in said housing downstream of said entrainment means including a thin sheet of porous media extending across the confined gas flow path, said sheet of media providing a maze of tortuous passages through which said gaseous stream must flow, means to prevent any upstream drainage to a point outside said confined path for said gaseous stream from said liquid flooded contact means to insure intimate contact of the coalescent liquid with the vapor-mist in said gaseous stream to thereby form liquid droplets in said gaseous stream, and separating means in said housing downstream of said contact means to separate the liquid droplets from said gaseous stream.

6. A device for removing vapor-mist from a gaseous stream comprising a housing providing a confined path for the flow of gas therethrough, entrainment means in said housing for entraining in said gaseous stream a liquid coalescent with the vapor-mist in said gaseous stream, liquid flooded contact means in said housing downstream of said entrainment means, means to prevent any upstream drainage to a point outside said confined path for said gaseous stream from said liquid flooded contact means to insure intimate contact of the coalescent liquid with the vapor-mist in said gaseous stream to thereby form liquid droplets in said gaseous stream, said contact means being positioned relative said housing to maintain liquid flooded conditions therein during operations, and separating means in said housing downstream of said contact means to separate the liquid droplets from said gaseous stream.

7. A device for removing vapor-mist from a gaseous stream comprising a vertical housing providing a confined path for the flow of gas therethrough, entrainment means in said housing for entraining in said gaseous stream a liquid coalescent with the vapor-mist in said gaseous stream, liquid flooded contact means in said housing downstream of said entrainment means including a thin sheet of porous media extending in a horizontal plane across the confined gas flow path with the edges of said media abutting the sides of said housing to prevent any upstream drainage to a point outside said confined path for said gaseous stream from said sheet of media to maintain a non-draining maze of tortuous passages through which said gaseous stream must flow to insure intimate contact of the coalescent liquid with the vapor-mist in said gaseous stream to thereby form liquid droplets in said gaseous stream, and separating means in said housing downstream of said contact means to separate the liquid droplets from said gaseous stream.

8. A device for removing vapor-mist from a gaseous stream comprising a housing providing a confined path for the flow of gas therethrough, entrainment means in said housing for entraining in said gaseous stream a liquid coalescent with the vapor-mist in said gaseous stream liquid flooded contact means in said housing downstream of said entrainment means, means to prevent any upstream drainage to a point outside said confined path for said gaseous stream from said liquid flooded contact means to insure intimate contact of the coalescent liquid with the vapor-mist in said gaseous stream to thereby form liquid droplets in said gaseous stream, and separating means in said housing downstream of said contact means to separate the liquid droplets from said gaseous stream, said separating means including a sheet of filter media extending across the confined gas flow path to separate the liquid droplets from the gaseous stream and drainage means to carry off the liquid droplets from said filter media.

9. A device for removing vapora-mist from a gaseous stream comprising a housing providing a confined path for the flow of gas therethrough, entrainment means in said housing for entraining in said gaseous stream a liquid coalescent with the vapor-mist in said gaseous stream, liquid flooded contact means in said housing downstream of said entrainment means, means to prevent any upstream drainage to a point outside said confined path for said gaseous stream from said liquid flooded contact means to insure intimate contact of the coalescent liquid with the vapor-mist in said gaseous stream to thereby form liquid droplets in said gaseous stream, and separating means in said housing downstream of said contact means to separate the liquid droplets from said gaseous stream, said separating means including sheets of filter media interleaved with spacer members, said interleaved sheets being positioned to permit gravity flow and drainage of the liquid droplets separated from the gaseous stream by the sheets of filter media.

10. A device for removing vapor-mist from a gaseous stream comprising a vertical housing providing a confined path for the flow of gas therethrough, entrainment means in said housing for entraining in said gaseous stream a liquid coalescent with the vapor-mist in said gaseous stream, said entrainment means including aperture-forming means extending in a horizontal plane across the confined gas flow path and presenting an aperture through which said gaseous stream is normally constrained to sweep at a velocity not lower than the minimum required to pick-up and thereby entrain coalescent liquid from said aperture-forming means along the edge of said aperture and means for supplying coalescent liquid to said aperture forming means in amounts controlled to provide a shoulder of liquid extending along and adjacent to the edge of said aperture, liquid flooded contact means in said housing downstream of said entrainment means including a thin sheet of porous media extending in a horizontal plane across the confined gas flow path with the edges of said media abutting the sides of said housing to prevent any upstream drainage to a point outside said confined path for said gaseous stream from said sheet of media to maintain a non-draining maze of tortuous passages through which said gaseous stream must flow to insure intimate contact of the coalescent liquid with the vapor-mist in said gaseous stream to thereby form liquid droplets in said gaseous stream, and separating means in said housing downstream of said contact means to separate the liquid droplets from said gaseous stream, said separating means including sheets of non-wettable acid resistant filter media interleaved with non-wettable, acid resistance spacer members, said interleaved sheets being positioned to permit gravity flow and drainage of the liquid droplets separated from the gaseous stream by the sheets of filter media.

References Cited in the file of this patent

UNITED STATES PATENTS

| | | |
|---|---|---|
| 1,102,685 | Proper | July 7, 1914 |
| 1,240,385 | Sweetland | Sept. 18, 1917 |
| 2,367,227 | Lowther | Jan. 16, 1945 |
| 2,655,221 | Russell | Oct. 13, 1953 |
| 2,889,004 | Nutting et al. | June 2, 1959 |

FOREIGN PATENTS

| | | |
|---|---|---|
| 256,367 | Great Britain | Aug. 12, 1956 |